Jan. 5, 1954
D. H. MacDONALD
2,665,322
METHOD OF MAKING THERMOCOUPLES
Filed June 4, 1951
2 Sheets—Sheet 1
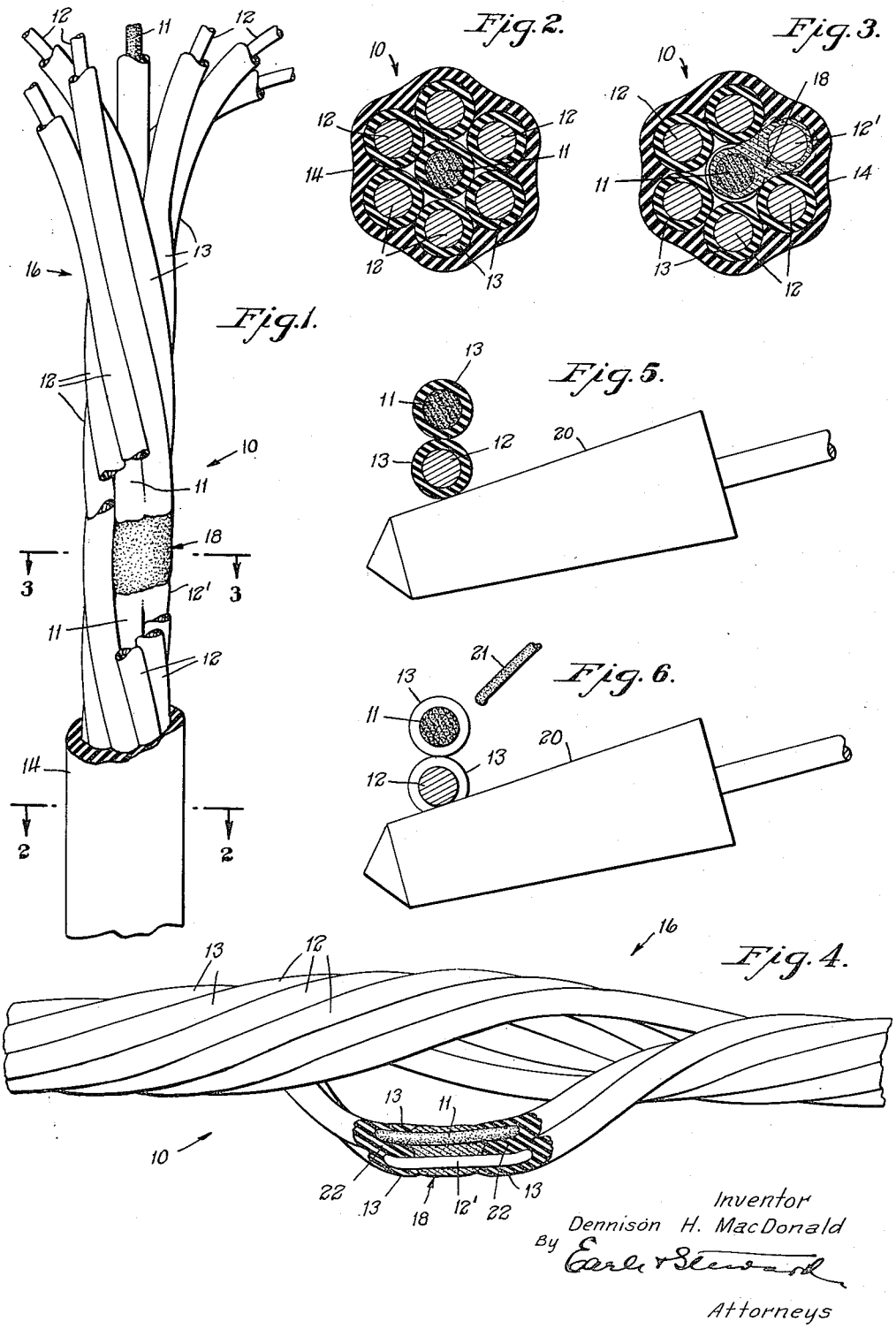
Inventor
Dennison H. MacDonald
By Earle & Steward
Attorneys Jan. 5, 1954  D. H. MacDONALD  2,665,322
METHOD OF MAKING THERMOCOUPLES
Filed June 4, 1951  2 Sheets-Sheet 2

Inventor
Dennison H. MacDonald
By Earle & Sturmul
Attorneys

Patented Jan. 5, 1954

2,665,322

UNITED STATES PATENT OFFICE 2,665,322

METHOD OF MAKING THERMOCOUPLES

Dennison H. MacDonald, East Haven, Conn., assignor to Revere Corporation of America, Wallingford, Conn., a corporation of Connecticut Application June 4, 1951, Serial No. 229,704

7 Claims. (Cl. 136—4)

This invention relates to a method of making thermocouples.

It is a broad object of the present invention to provide method of making a thermocouple which is easier to manufacture and costs less, yet is more reliable in operation and less impaired by even rough usage over a longer period, than previous thermocouples.

It is another object of the present invention to provide method of making a thermocouple of which the insulated electro-conductive strands of dissimilar compositions are connected with each other by solidified electro-conductive metal which joins and is fused to insulation-bared lengths of the strands, thereby to obtain a simple and strong connection between these strands which will safely withstand for an indefinite time the usual and even exceptional stresses to which the thermocouple may be subjected in its use.

A further object of the present invention is the provision method of making a thermocouple of this type of which the various connections between the strands are in the form of inexpensive and easily applied solder joints.

Another object of the present invention is to provide method of making a thermocouple of this type of which the electro-conductive strands have coatings of nylon which in the immediate vicinity of the connections between the strands of dissimilar compositions are fused together by the heat accompanying the application of the strand-connecting solidified metal, so that these fused-together nylon coatings reenforce the connections between the strands of dissimilar compositions.

It is a further object of the present invention to provide a thermocouple of this type of which all the strands are twisted-together into a rope and adjacent lengths of the strands of dissimilar compositions at spaced intervals longitudinally of the rope are independently intertwisted prior to their connections intermediate the respective intertwisted strand lengths, so that the latter will, by virtue of their intertwist, further reenforce the connections between the strands, and will furthermore be held against untwisting by these connections.

It is another important object of the present invention to devise a method of making thermocouples of this type efficiently and at very low cost, not only by the easy and quick connection of adjacent lengths of the conductive strands of the thermocouples with solder, but also by eliminating the heretofore imperative and tedious task of baring these strand lengths preceding their connection and instead removing the insulation therefrom solely by the effect of the heat required by and in the course of the application of the solder thereto.

Other objects and advantages will appear to those skilled in the art from the following, considered in conjunction with the accompanying drawings.

In the accompanying drawings, in which certain modes of carrying out the present invention are shown for illustrative purposes:

Fig. 1 is an elevational view, broken away in part, of a thermocouple made by a method embodying the present invention;

Figs. 2 and 3 are enlarged cross-sections through the thermocouple taken on the lines 2—2 and 3—3, respectively, of Fig. 1;

Fig. 4 shows an intermediate length of the partly-finished thermocouple unwound for the connection of certain electro-conductive strands thereof;

Figs. 5 and 6 show progressive steps in making a connection between certain electro-conductive strands of the partly-finished thermocouple;

Figure 7:
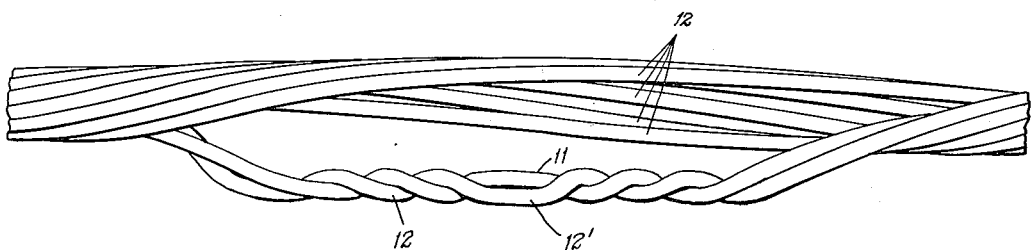
Fig. 7 shows an intermediate length of a partly-finished thermocouple embodying the present invention in a modified manner.

Referring to the drawings, and more particularly to Figs. 1 to 3 thereof, the reference numeral 10 designates a thermocouple which is in the form of a composite rope and comprises, in the present instance, seven thermocouple strands which are spirally twisted together. One of the strands, designated by the reference character 11, is in the form of an electro-conductive wire of a composition which differs from that of any of the remaining electro-conductive wire strands designated by the reference characters 12. The wire strands 12 may all be of the same composition.

Each of the wire strands 11 and 12 is provided with an insulating coating 13 which serves to insulate each conductive wire strand from the others, and the gathered and spirally-twisted strands 11 and 12 are further provided with an external insulating coating 14 which serves as added insulation to shield the strands 11 and 12 externally.

As above mentioned, the wire strand 11 is of a composition which differs from that of the ther wire strands 12 to thus provide, in accordance with well-understood thermocouple principles, an electro-potential therebetween which varies with circumambient temperatures. By way of example, the wire strand 11 may be an alloy of approximately 40% nickel and 60% copper, while the other wire strands may be formed of straight copper. Of course, many other electro-conductive materials may be used for the wire strands 11 and 12 without affecting the scope of the present invention.

The coatings 13 on the individual wire strands 11 and 12 may be formed of any suitable insulating material which preferably has a melting point in the neighborhood of that of solder to be used for the connection of the wire strands as hereinafter described. In the present instance, nylon is preferred for the coatings 13, owing to its resistance to relatively high temperatures and other desirable characteristics. Preferably, also the coatings 13 of the respective wire strands are given different colors so as to be readily identified anywhere in the thermocouple. The aforementioned external protective coating 14 of the thermocouple is also preferably formed of nylon since the latter has the desirable characteristics of combining flexibility, moisture-impermeability and abrasion resistance.

Pursuant to the objects of the present invention, the insulation-coated wire strands 11 and 12 are, in the preferred manufacture of the thermocouple 10, first gathered and spirally twisted together so as to form a rope 16 of substantial length. In order to obtain the electro-potential between the wire strand 11 and the respective wire strands 12 at different points longitudinally of the rope 16, the strand 11 is electro-conductively connected with the strands 12, respectively, at longitudinally spaced intermediate points of said rope 16. Since these connections may be identical in every respect, the formation of one of these connections, namely the connection 18 between the strands 11 and 12', will be sufficient for an understanding of all connections. Thus, assuming that the connection 18 between the strands 11 and 12' is to be made at a point intermediate the ends of the rope 16, the latter is unwound over a length extending to both sides of the point mentioned and the unwound portions of the strands 11 and 12' are spread apart as shown in Fig. 4. Thereupon, the strands 11 and 12' to-be-connected are separated from the remaining strands 12 and bent into close proximity to each other. Next, heat is applied to a length of the closely-adjacent strands 11 and 12' in order to remove, by melting, the coatings 13 thereon. Since the coatings 13 are in this instance formed of nylon which melts at a temperature required for ordinary soldering purposes, there may be held against the closely adjacent lengths of the strands 11 and 12', for the removal of the coatings 13 thereon, a solder iron 20 (Fig. 5) which is heated to a temperature requisite for melting and flowing solder. On the application of heat, in the present instance the hot solder iron 20 as explained, the nylon-coatings 13 will quickly melt and run off the closely proximate lengths of the strands 11 and 12', leaving these strand lengths bare (Fig. 6) for the immediate reception of solder from a solder wire or rod 21 which is held against the iron 20, the melting solder being applied and spread by the iron over the bare strand lengths (Fig. 4). The nylon-coatings 13 melt and flow off so rapidly that the solder iron 20 need be applied only once to the lengths of the strands 11 and 12' to be connected both for melting away the coatings 13 and immediately thereafter applying the solder thereto. The solder thus applied forms between the strands 11 and 12' a permanent electro-conductive connection which will safely withstand for an indefinite time the usual and even exceptional stresses to which the thermocouple may be subjected in its use. The connection 18 is also complete in that the connected lengths of the strands 11 and 12' are embedded or substantially embedded in the solder applied thereto. Moreover, the solder connection 18 is continuous with the interrupted coatings 13 on the strands 11 and 12', wherefore no portions of the latter are left bare. By reason of the heat accompanying the application of solder for forming the connection 18 between the strands 11 and 12' as explained, substantial lengths of the nylon-coatings on these strands which immediately flank the connection 18 become fused together as indicated at 22 in Fig. 4, thereby considerably reenforcing the connection 18 against rupture or breakage.

After solidification of the applied solder, which takes place shortly after its application, the rope 16 may conveniently be stretched so as to contract the spread intermediate portions of the strands 11 and 12 into the body of the rope, whereupon the contracted strand portions may be twisted so as to conform to the general twist of the strands in the thermocouple.

The electro-conductive connections between the strand 11 and the respective other strands 12 may be made in exactly the same fashion as described above in connection with the connection 18 between the strands 11 and 12'. After all connections between the strands 11 and 12 are thus made, the external coating 14 may be applied to the rope 16. This may conveniently be accomplished by extruding nylon on the rope 16 as the latter passes through an extrusion die.

It follows from the preceding that the manufacture of the instant thermocouple is extremely simple and inexpensive and requires little, if any, special skill on the part of the manufacturing personnel. Thus, the removal of the insulation from the thermocouple strands by the heat required for making the various solder connections between them eliminates the heretofore imperative tedious and time-consuming task of stripping insulation from these strands prior to their connection. Moreover, the instant thermocouple is, by virtue of the permanent solder connections between the various strands thereof, and the fused nylon-coatings on the latter in the immediate vicinity of their solder connections, also more reliable in operation and less impaired by even rough usage over a long period of time, than previous thermocouples.

Figure 8:
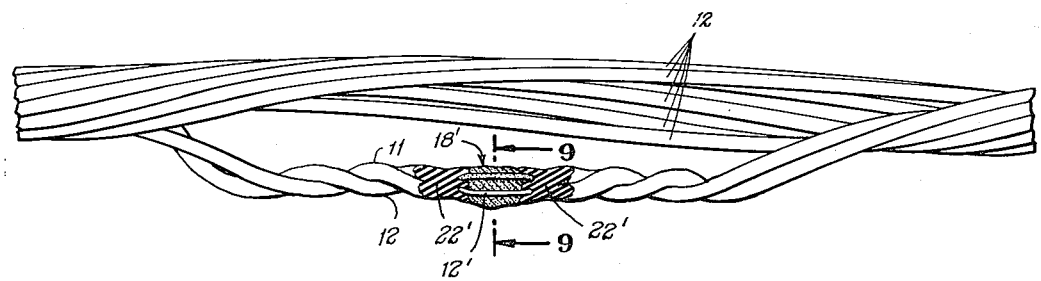
Fig. 8 shows the partly-finished modified thermocouple of Fig. 7 in an advanced stage of its manufacture.
Figure 9:
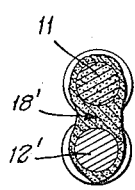
Fig. 9 is an enlarged section taken on the line 9—9 of Fig. 8.

Reference is now had to Fig. 7 in which the lengths of the strands 11 and 12' are, after their separation from the adjacent lengths of the remaining strands 12, twisted together independently of the latter as a modified step in the manufacture of the thermocouple. Thereupon, heat is applied to an intermediate portion of the intertwisted strand lengths 11 and 12' to remove the nylon-coatings on said intermediate portion and apply solder thereto to form the connection 18' (Figs. 8 and 9) in the same or similar manner explained hereinbefore. The nylon-coatings on the strands 11 and 12' will, under the heat applied for forming the solder connection 18', become fused together for some distance on opposite sides of the connection 18', as is indicated at 22' in Fig. 8. The instant modified thermocouple may then be finished the same as the previously described thermocouple, and the connections 18' in the instant modified thermocouple are even further reenforced against rupture and breakage by the described intertwist of the strand lengths in which the connections 18' are provided.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. The method of connecting in a thermocouple separate electro-conductive strands each being coated with insulation having a melting point near that of solder, comprising the steps of bringing intermediate lengths of said strands, respectively, into close proximity to each other; applying heat to the closely proximate strand lengths preliminary to joining them with solder, thereby melting away the insulation on said intermediate strand lengths; and applying molten solder to said closely proximate strand lengths while the latter are still hot, so that the applied solder and melted insulation, when solidified, will join said proximate strand lengths permanently.

2. The method of connecting in a thermocouple separate electro-conductive strands each being coated with insulation of a melting point near that of solder, comprising the steps of holding intermediate lengths of said strands, respectively, in close proximity to each other; holding a hot solder iron in heat-exchange relation with said closely proximate strand lengths to heat them preliminarily to joining them with solder, thereby melting off the insulation coating on said strand lengths; and applying solder to the hot iron, while the latter is held in heat-exchange relation with said closely proximate strand lengths, for deposition of the solder on the latter to form a permanent connection therebetween.

3. The method of connecting in a thermocouple separate electro-conductive strands each being coated with insulation having a melting point near that of solder, comprising the steps of spirally twisting together intermediate lengths of said strands, applying heat to an intermediate portion of said twisted-together strand lengths preliminary to joining them with solder, thereby melting away the insulation on said intermediate portion of the twisted-together strand lengths and fusing together the insulation on said twisted-together strand lengths immediate adjacent said intermediate portion thereof; and applying molten solder to said intermediate portion of the twisted-together strand lengths while the same is still hot.

4. The method of connecting in a thermocouple two single ones of a multiplicity of electro-conductive strands which are gathered into a rope and each of which is coated with insulation of a melting point lower than that of solder, comprising the steps of laterally drawing adjacent intermediate lengths of said two strands out of the rope formation of the adjacent lengths of the remaining strands; bringing intermediate portions of said drawn-out strand lengths into close proximity to each other; applying heat to said closely proximate strand portions preliminary to joining them with solder, thereby melting away the insulation on said closely proximate strand portions; applying molten solder to said closely proximate strand portions while the latter are still hot for permanent connection of said strand portions; and re-gathering said intermediate lengths of said two strands with the remainder of the rope after substantial solidification of the molten solder applied.

5. The method of connecting in a thermocouple two single ones of a multiplicity of electro-conductive strands which are gathered into a rope and each of which is coated with insulation of a melting point lower than that of solder, comprising the steps of laterally drawing adjacent intermediate lengths of said two strands out of the rope formation of the adjacent lengths of the remaining strands; spirally twisting together said drawn-out strand lengths; applying heat to an intermediate portion of said twisted-together strand lengths preliminary to applying solder to said portion, thereby melting away the insulation on said intermediate portion of the twisted-together strand lengths; applying molten solder to said intermediate portion of the twisted-together strand lengths while said portion is still hot; and re-gathering said twisted-together strand lengths with the remainder of the rope after substantial solidification of the molten solder applied.

6. The method of connecting in a thermocouple two single ones of a multiplicity of electro-conductive strands which are gathered into a rope and each of which is coated with insulation of a melting point lower than that of solder, comprising the steps of laterally drawing adjacent intermediate lengths of said two strands out of the rope formation of the adjacent lengths of the remaining strands; spirally twisting together said drawn-out strand lengths; holding a hot solder iron against an intermediate portion of said twisted-together strand lengths preliminary to applying solder to said portion, thereby melting away the insulation on said intermediate portion of the twisted-together strand lengths; applying solder to the hot iron, while the latter is held against said intermediate portion of the twisted-together strand lengths, for deposition of the solder on said portion to form a permanent connection between the strand parts thereof; and re-gathering said twisted-together strand lengths with the remainder of the rope after substantial solidification of the molten solder applied.

7. The method as set forth in claim 6, in which said hot iron is held substantially continuously against said intermediate portion of the twisted-together strand lengths for the removal of the insulation from and the subsequent application of solder to said portion.

DENNISON H. MacDONALD.

References Cited in the file of this patent
UNITED STATES PATENTS

| Number | Name | Date |
| --- | --- | --- |
| 1,365,465 | Isles | Jan. 11, 1921 |
| 2,216,835 | Hume | Oct. 8, 1940 |
| 2,250,156 | Ferguson | July 22, 1941 |